(12) United States Patent
Okayama et al.

(10) Patent No.: US 6,620,860 B2
(45) Date of Patent: Sep. 16, 2003

(54) FRICTION MATERIAL

(75) Inventors: Katsuya Okayama, Itami (JP); Yukinori Yamashita, Itami (JP); Hiroyuki Fujikawa, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/793,918

(22) Filed: Feb. 28, 2001

(65) Prior Publication Data

US 2002/0169231 A1 Nov. 14, 2002

(51) Int. Cl.⁷ ................................ C08K 3/14
(52) U.S. Cl. ................ 523/149; 523/152; 523/156; 260/998.15; 508/108
(58) Field of Search ................ 523/149, 150, 523/152, 155, 156, 157, 158; 260/998.13

(56) References Cited

U.S. PATENT DOCUMENTS

| | | | | |
|---|---|---|---|---|
| 4,324,706 A | * | 4/1982 | Tabe et al. ........... | 523/149 |
| 4,563,495 A | * | 1/1986 | Kawaguchi et al. .... | 524/413 |
| 5,339,931 A | | 8/1994 | Jacko et al. | |
| 5,383,963 A | * | 1/1995 | Kobayashi et al. ..... | 106/36 |
| 5,891,933 A | * | 4/1999 | Kasevan et al. ....... | 523/158 |
| 5,971,113 A | * | 10/1999 | Kasevan et al. ....... | 188/251 |
| 6,355,601 B1 | * | 3/2002 | Takenaka et al. ...... | 508/108 |

FOREIGN PATENT DOCUMENTS

| | | |
|---|---|---|
| JP | 6-228539 | 8/1994 |
| JP | 8-510003 | 10/1996 |
| JP | 345142 | 12/2000 |
| JP | 2000-345142 | 12/2000 |

OTHER PUBLICATIONS

Patent Abstracts of Japan, Tsugawa et al., Nonabestine Friction Material, Publication No. 06228539 A, Aug. 16, 1994, which is a family member of JP 6–228539 A.

Derwent Abstract, WPI Acc. No. 1994–271435/199433, Automotive brake system consisting of friction pads and aluminum composite rotor–contains porous copper powder in friction pads to form protection glaze for the rotors, which is a family member of JP 8–510003, published Oct. 22, 1996, including abstracts for U.S. Pat. No. 5,339,931 and EP698188 B.

English Language Abstract of JP 2000–345142.

\* cited by examiner

*Primary Examiner*—Edward J. Cain
*Assistant Examiner*—Katarzyna Wyrozebski Lee
(74) *Attorney, Agent, or Firm*—Greenblum & Bernstein, P.L.C.

(57) ABSTRACT

A friction material suitable for mating with a disk rotor or drum consisting mainly of an aluminum alloy reinforced by a hard material. The friction material suppresses the generation of a scoring on the disk rotor or drum. It also suppresses the change in the coefficient of friction before and after a heat history. The friction material comprises not only an organic-fiber base material, a binder resin, a friction-adjusting agent, a filler, and an inorganic powder, but also an inorganic fiber and a metal powder having a particle diameter of 1 to 180 μm.

12 Claims, 2 Drawing Sheets

(A)　　　(B)　　　(C)　　　(D)

FRICTION MATERIAL

BACKGROUND OF THE INVENTION

1. Field of the Invention

The present invention relates to a friction material for brakes, clutches, etc. used in railroad cars, trucks, passenger cars, etc., especially a friction material that engages with a rotor or drum comprising an aluminum alloy reinforced by a hard material.

2. Related Background Arts

FC 20 to 30 cast iron traditionally has been mainly used as a material for rotors and drums used in brakes, clutches, etc. However, in passenger cars, for example, an aluminum alloy reinforced by a hard material has increasingly been used to reduce the weight of the members to reduce fuel consumption.

Not only are rotors and drums required to be light weight but also to have high resistance to heat and wear. To meet these requirements, they are produced, for example, by the following two methods:

(a) a casting method in which a molten aluminum alloy is mixed with a hard material composed of a ceramic, such as silicon carbide (SiC), alumina ($Al_2O_3$), silicon oxide ($SiO_2$), zirconium oxide ($ZrO_2$), and magnesium oxide (MgO); and (b) a hot-press forming method in which a sheet of aluminum foil and a sheet of pre-impregnated carbon fiber are alternately laminated.

Because the method (b) is complicated in manufacturing process and therefore costly, the method (a) has been adopted mainly in recent years.

Friction materials are shifting to the use of a non-asbestos family, in which no asbestos is used, in consideration of human health. Non-asbestos-family friction materials use a heat-resistant organic fiber, a glass fiber, a metal fiber, etc. for the fibrous base material; phenolic resin for the binder; graphite for the friction adjusting agent; and barium sulfate, calcium carbonate, etc. for the filler.

When applying the brake, the friction between the friction material and the rotor or drum generates heat. Therefore, friction materials are required to have a stable and high coefficient of friction at the rubbing surface, which engages with the rotor or drum, in a wide range of temperatures from below-freezing point to hundreds of degrees. They are also required to have sufficient wear resistance.

The published Japanese patent application Tokukaihei 6-228539 discloses a combination of a non-asbestos-family friction material and a rotor composed of an aluminum alloy reinforced by a hard material. This patent application explains that the hard materials to be added to aluminum-alloy rotors generally have a Mohs hardness of 6 or more in many cases and that the hard inorganic materials to be added to friction materials also have a Mohs hardness of 6 or more, preferably eight or more.

According to this patent application, it is desirable that the hard inorganic material to be added to a friction material have an amount of 0.1 to 30 vol % and have a particle diameter of 0.2 to 250 $\mu$m in the case of powder and a diameter of 0.1 to 10 $\mu$m and a length of 1 $\mu$m to 5 mm in the case of fiber.

The patent application illustrates that examples of the hard inorganic materials include metal carbides such as silicon carbide (SiC); ceramic materials composed of alumina ($Al_2O$), silicon oxide ($SiO_2$), zirconium oxide ($ZrO_2$), magnesium oxide (MgO), or a combination of these; and hard metals such as various intermetallic compounds and a nickel-chrome alloy. It also explains that the conventional art using a combination of such a rotor and friction material exhibits not only excellent braking force and wear resistance but also offers a superior effect on the reduction of the tendency to attack the mating surface, that is, the rotor surface that engages with the friction material.

Another Japanese laid-open patent application, Tokuhyouhei 8-510003, states that when a porous copper powder is added to a non-asbestos friction material, which is usually used as the friction material to be coupled with an aluminum-alloy rotor, a "surface glaze" is formed on the surface of the rotor, thereby stabilizing the friction property. According to the patent application, the "surface glaze" is a coating consisting mainly of organic constituents, and the formation of the coating is promoted by the porous copper powder.

As the rubbing between the rotor and the friction material progresses, all the fine powders released from the worn-out friction material are deposited in the form of a coating on the surface of the rotor by the action of the braking heat. The coating is ground by the hard inorganic material in the friction material, leaving exposed portions of the aluminum material on the surface of the rotor. The friction material usually includes a metal fiber that has good conformability with aluminum (a brass fiber in the case of the above conventional art). The metal fiber comes in to contact with the exposed portion of the aluminum material in the rotor and produces a local temperature rise (a heat spot) by the frictional heat.

The heat spot softens the rotor locally, and the aluminum alloy and the metal fiber in the friction material seize up mutually, generating a ring-shaped large groove referred to as "a scoring" on the friction surface of the rotor. In the present invention, the term "a scoring" is used to mean the foregoing ring-shaped large groove generated on the friction surface of the rotor. The scoring causes not only abnormal wear of the rotor but also of the friction material itself, entailing the generation of braking vibration and a reduction in the coefficient of friction.

There is one more point to mention. As described above, Tokuhyouhei 8-510003 states the formation of a coating called a surface glaze on the surface of the rotor. This coating causes a reduction in frictional force. Therefore, it is necessary to prevent the excessive growth of this coating.

SUMMARY OF THE INVENTION

An object of the present invention is to offer a friction material to be coupled with a rotor or a drum consisting mainly of an aluminum alloy reinforced by a hard material. The friction material comprises (a) a base material composed of an organic fiber, (b) an inorganic fiber other than a metal fiber, and (c) a metal powder having a particle diameter of 1 to 180 $\mu$m. As mentioned above, a metal fiber is not to be contained.

The inorganic fiber to be used plays the role of suppressing the growth of the coating formed on the rotor. Therefore, the inorganic fiber should not be softened by the frictional heat. It is desirable that the inorganic fiber have a softening point of 850° C. or higher.

The frictional heat does not necessarily raise the surface temperature of the friction material uniformly. It may produce a local high-temperature heat spot. Consequently, the friction material is required to have durability at considerably higher temperatures than the melting point of the mating aluminum alloy.

If the inorganic fiber is excessively hard, it grinds the surface of the rotor. If excessively soft, it cannot remove the coating on the surface of the rotor. The inorganic fiber preferably has a Mohs hardness of 3 to 5. It is recommendable to use a potassium titanate fiber or slag wool as the inorganic fiber that has a Mohs hardness of 3 to 5 and a softening point of 850° C. or higher.

It is desirable that the foregoing metal powder have a particle diameter of 1 to 180 $\mu$m, more desirably 20 to 45 $\mu$m. If less than 1 $\mu$m, the material-manufacturing process becomes complicated and high-cost. If more than 180 $\mu$m, the metal powder may cause an undesirable phenomenon similar to that which occurs when a metal fiber is added as described below.

The particle diameter of 20 $\mu$m or more can secure the heat-dissipating quality of the friction material. The particle diameter of 45 $\mu$m or less can suppress the mating-surface attacking. Furthermore, the particle diameter of 20 to 45 $\mu$m is superior in mixing workability and material cost.

It is desirable that the foregoing metal powder comprises at least one member selected from the group consisting of a copper powder, an iron powder, and an aluminum powder; or comprises at least one member selected from the group consisting of a copper-alloy powder, an iron-alloy powder, and an aluminum-alloy powder. If the metal powder is excessively hard, it may attack the mating material. Therefore, the metal powder is required to be soft to a certain extent and to have high thermal conductivity in order to disperse the frictional heat before prior to the formation of a heat spot.

The amount of the metal powder to be added is determined by the amount necessary to dissipate the heat generated at the time of brake application. It is desirable that the amount be 1 to 20 vol % of the material of the friction material.

The friction material comprises as a whole:
(a) a 5 to 20 vol % organic-fiber base material comprising an aramid fiber;
(b) a 13 to 25 vol % binder resin;
(c) a 5 to 25 vol % inorganic fiber;
(d) a 1 to 20 vol % metal powder having a particle diameter of 1 to 180 $\mu$m;
(e) a 10 to 40 vol % friction adjusting agent comprising graphite, molybdenum disulfide, and cashew dust;
(f) a 2 to 30 vol % filler comprising barium sulfate, calcium carbonate, and calcium hydride; and
(g) a 2 to 30 vol % inorganic powder comprising zirconium silicate and mica.

The amounts of these materials are adjusted according to the use and required performance of the friction material.

As described above, conventional friction materials are required to improve their performance when they are intended for use in brakes incorporating disk rotors or drums composed of an aluminum alloy. The present invention offers solutions to meet this requirement. Specifically, scoring that occurs when a composition including a metal fiber is used can be prevented by using the metal powder and inorganic fiber of the present invention in place of the metal fiber. The reduction in the coefficient of friction after a thermal histeresis can be suppressed by the addition of the inorganic fiber of the present invention. If the metal powder has an excessively large particle diameter, it loses its effect. Consequently, it is preferable to use a metal powder having a particle diameter of 1 to 180 $\mu$m, more preferably 20 to 45 $\mu$m. If the inorganic fiber is excessively hard, it attacks the mating material such as a rotor to a large extent. Therefore, it is preferable to use an inorganic fiber having a Mohs hardness of 3 to 5. Such a selection of material makes it possible to offer a friction material suitable for mating with a disk rotor or drum made of an aluminum alloy.

DESCRIPTION OF THE PREFERRED EMBODIMENTS

Figure 1:
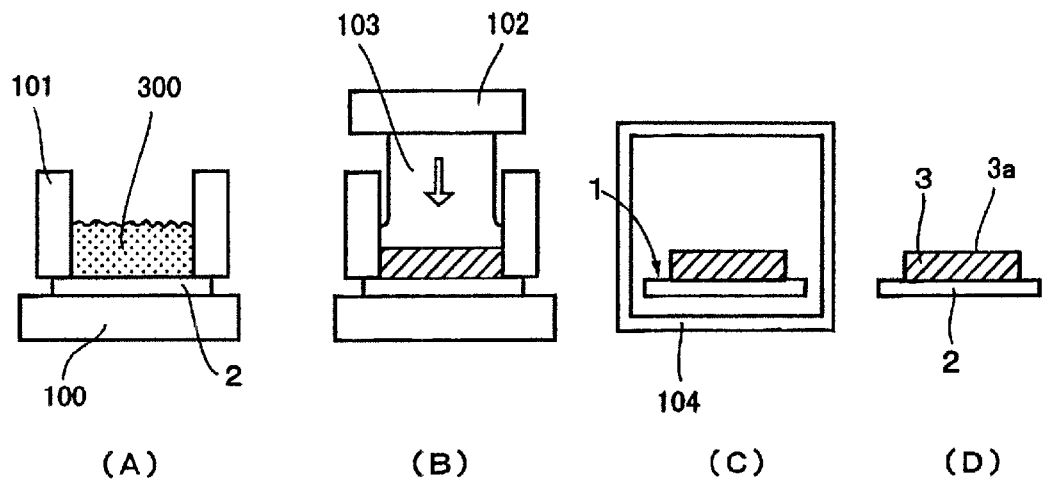
FIG. 1 is an illustration showing the manufacturing process of a disk-brake pad incorporating the friction material of the present invention.

An in-depth observation revealed that scoring occurs on the surface of the rotor in the following manner: When the brake is applied, fine powders produced by the wear of the friction material are deposited on the surface of the rotor, forming a coating there. The coating is ground by the inorganic material, having a relatively high Mohs hardness, included in the friction material, partially exposing the aluminum material. Rubbing the aluminum with the metal fiber in the friction material generates a heat spot. The metal fiber is dragged from the heat spot to a point where it is broken, producing a scoring.

The present invention uses a heat-resistant organic fiber in place of the metal fiber used as the fibrous base material that reinforces the friction material. The function of the metal fiber to dissipate the heat generated by braking is carried out by a metal powder. The metal powder has high thermal conductivity, that enables it to disperse throughout the rotor surface or release into the atmosphere the heat generated by braking, thereby suppressing the generation of a heat spot. Even when the metal powder rubs the aluminum material exposed by the hard inorganic material, individual metal powders easily fall off at the time of rubbing without leaving a scoring.

As mentioned above, the replacement of the metal fiber with the metal powder can suppress the generation of a heat spot. However, repetition of hard rubbing increases the thickness of the coating on the surface of the rotor. The present inventors noted that the coating is softer than the rotor surface and that although the coating has little influence when it is thin, it causes a reduction in frictional force when it grows to be thick.

In the conventional methods, the coating is removed by the metal fiber. The metal fiber, however, has the above-described drawback. On the other hand, the metal powder falls off at the same time that it removes the coating. If the friction material has a fibrous material of which a part functions as a frictional agent at the rubbing surface and the remaining part stays in the friction material, the fibrous material can maintain the coating-removing effect without falling off.

This concept leads to the use of an inorganic fiber other than a metal fiber. However, if the inorganic fiber is excessively hard, it may attack the rotor at the same time that it removes the coating. Consequently, when a hard inorganic fiber is to be used, the amount should be small. In order to eliminate the possibility of local interaction between the inorganic fiber and the rotor, it is desirable that the inorganic fiber have a Mohs hardness of 3 to 5. The inorganic fiber having the Mohs hardness in this range has no rotor-attacking effect even when it is used in substantial amounts. When used in large amounts, the inorganic fiber can be distributed over the entire rubbing surface of the friction material, to allow the friction material to maintain a uniform frictional surface.

The effect of the inorganic fiber is explained through the examples below. The friction material used in the examples comprises an inorganic fiber and a metal powder having a particle diameter of 1 to 180 $\mu$m. The composition is shown in Tables 1 and 3.

FIG. 1 shows the manufacturing process of a disk-brake pad.

In the step (A), a back plate 2 of a disk-brake pad 1 is placed on a bottom mold 100. A die 101 having a space corresponding to the shape of a friction material 3 is set on the back plate 2. The space is filled with a mixed material 300 including a binder.

In the step (B), a top mold 102 accompanied by a top punch 103 is pressed in the direction of the arrow at a pressure of 29.4 MPa to form the mixed material. With this pressure applied, the mixed material is heated for about 10 minutes at a temperature of about 150° C., at which temperature the binder in the mixed material 300 undergoes a hardening reaction.

After the hot forming, the top mold 102 and the bottom mold 100 are detached. The disk-brake pad 1 is removed. In the step (C), the disk-brake pad 1 is maintained in an atmosphere at a temperature of about 225° C. for 5 to 8 hours in a hot-hardening furnace 104 in order to harden the remaining uncured portion.

In the step (D), a rubbing surface 3a, which rubs the rotor, is ground to obtain a specified dimension. This completes the disk-brake pad 1.

Figure 2:
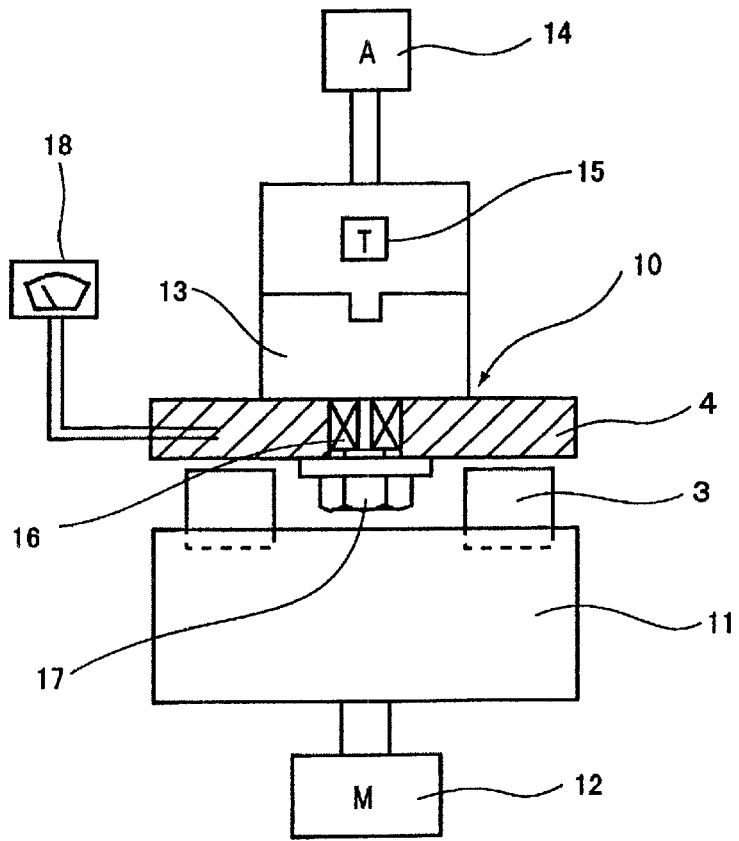
FIG. 2 is a schematic illustration showing the structure of a testing machine for evaluating the properties of the friction material of the present invention.

FIG. 2 shows the structure of a testing machine 10 for evaluating the coefficient of friction between a friction material 3 and a rotor 4, the magnitude of wear, and the generation of a scoring. A rotating stand 11, having a large moment of inertia, is rotated by a motor 12 underneath. A friction material 3 is set on the rotating stand 11. A non-rotating fixing mount 13 has at its center a square stem 16 with which the rotor 4 is engaged. The rotor 4 is fixed to the mount with a fixing nut 17. The fixing mount 13 is moved up and down by an actuator 14 above. The pressurizing force onto the friction material 3 is adjusted through a torque sensor 15. A thermo-couple 18 is embedded in the vicinity of the rubbing surface of the rotor 4 to measure the temperature at the time of brake application.

Figure 3:
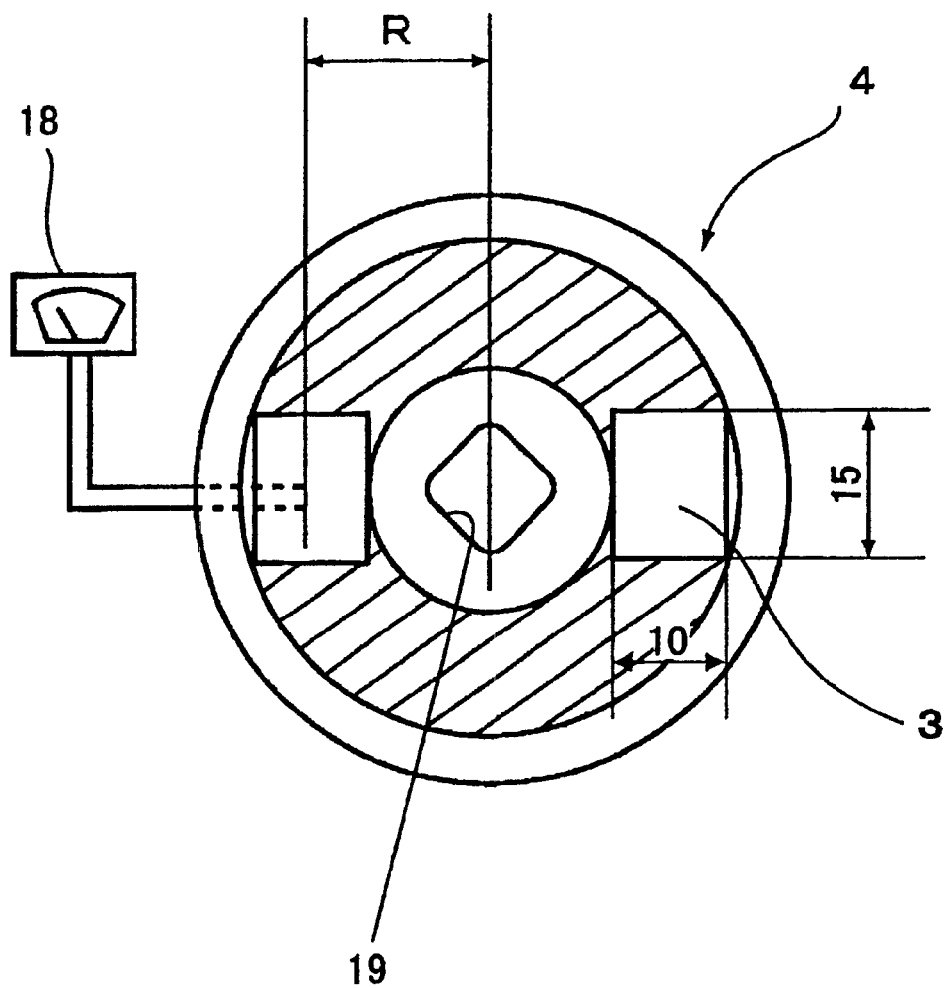
FIG. 3 is a schematic diagram showing the rotor and the neighboring embers of the testing machine.

FIG. 3 is a schematic diagram showing the rotor 4 and the neighboring members. The rotor 4, 10 mm in thickness and 60 mm in outer diameter, has at its center a square hole 19 with which the square stem 16 of the fixing mount 13 is engaged. The thermo-couple 18 is embedded at a place of the effective braking radius R=14 mm of the rubbing portion shown by hatch lines. The friction material 3 has a length of 15 mm, a width of 10 mm, and a thickness of 10 mm. A pair of the friction materials 3 are set symmetrically at the places corresponding to the effective braking radius R of the rotating stand 11 with respect to the rotating shaft.

Table 1 shows the composition of the friction material 3 formed in accordance with the manufacturing process shown in FIG. 1. In these examples, an aramid fiber, which is organic, was used as the fiber base material; phenolic resin, as the binder; graphite, molybdenum disulfide, and cashew dust, as the friction adjusting agent; barium sulfate and calcium hydride, as the filler; and zirconium silicate and mica, as the inorganic powder. As the inorganic fiber, which is a constituent of the present invention, an aluminosilicate fiber (brand name: CFF), a potassium titanate fiber (brand name: TXAX), and slag wool were used. The inorganic fiber was mixed with the below-mentioned metal powder. In the examples shown in Table 1, in order to distinguish the effect of the inorganic fiber from the effect of the metal powder, the amounts of the other constituents were maintained unchanged in vol %.

The metal powders of copper and iron were prepared by meticulously crushing purchased powders with a stamp mill. The screening of the particle diameter was performed mainly by using sieves as follows: The powder having a particle diameter of 75 to 180 $\mu$m was obtained by sieving with a sieve of 200 mesh a powder that passed through a sieve of 80 mesh. The powder having a particle diameter of 20 to 45 $\mu$m was obtained by sieving with a sieve of 635 mesh a powder that passed through a sieve of 325 mesh. The fine powder having a particle diameter of 1 to 10 $\mu$m was obtained by the cyclone-type centrifugal classification method.

The metal fiber was produced by a well-known method using a specific cutting tool.

TABLE 1

| Constituent | Specific name | Unit | 1 | 2 | 3 | 4 | 5 | 6 | 7 | 8 | 9 | 10 |
|---|---|---|---|---|---|---|---|---|---|---|---|---|
| Organic-fiber base material | Aramid fiber | vol % | 10 | 10 | 10 | 10 | 10 | 10 | 10 | 10 | 10 | 10 |
| Binder resin | Phenolic resin | vol % | 20 | 20 | 20 | 20 | 20 | 20 | 20 | 20 | 20 | 20 |
| Friction-adjusting agent | Graphite | vol % | 6 | 6 | 6 | 6 | 6 | 6 | 6 | 6 | 6 | 6 |
| | Molybdenum disulfide | vol % | 3 | 3 | 3 | 3 | 3 | 3 | 3 | 3 | 3 | 3 |
| | Cashew dust | vol % | 11 | 11 | 11 | 11 | 11 | 11 | 11 | 11 | 11 | 11 |
| Filler | Barium sulfate | vol % | 7 | 7 | 7 | 7 | 7 | 7 | 22 | 22 | 22 | 17 |
| | Calcium hydride | vol % | 3 | 3 | 3 | 3 | 3 | 3 | 3 | 3 | 3 | 3 |
| Inorganic powder | Mica and Zirconium silicate | vol % | 20 | 20 | 20 | 20 | 20 | 20 | 20 | 20 | 20 | 20 |
| Inorganic fiber | Potassium titanate *3 | vol % | 15 | 10 | 15 | 15 | 10 | 15 | | | | |
| | Slag wool *4 | vol % | | 5 | | | 5 | | | | | |
| | CFF *5 | vol % | | | | | | | | | | 5 |
| Metal powder | Copper powder (20 to 45 μm) | vol % | 5 | | | | | | | | 5 | 5 |
| | Copper powder (1 to 10 μm) | vol % | | 5 | | | | | | | | |
| | Copper powder (75 to 180 μm) | vol % | | | 5 | | | | | | | |
| | Iron powder (20 to 45 μm) | vol % | | | | 5 | | | | | | |
| | Iron powder (1 to 10 μm) | vol % | | | | | 5 | | | | | |
| | Iron powder (75 to 180 μm) | vol % | | | | | | 5 | | | | |
| Metal fiber | Copper fiber *1 | vol % | | | | | | | 5 | | | |
| | Iron fiber *2 | vol % | | | | | | | | 5 | | |
| Total | | vol % | 100 | 100 | 100 | 100 | 100 | 100 | 100 | 100 | 100 | 100 |

*1: Diameter: 100 to 500 μm, Length: 1 to 5 mm.
*2: Diameter: 100 to 500 μm, Length: 1 to 5 mm.
*3: Mohs hardness: 4
*4: Mohs hardness: 3.5
*5: Mohs hardness: 6

Various friction materials 3 were evaluated by using the testing machine 10 as follows: When the circumferential speed at the effective braking radius of the rotating stand 11 reached 5 m/s, the motor 12 was de-energized, allowing the rotating stand 11 to rotate by the moment of inertia. The actuator 14 was controlled in such a manner that the pressure exerted by the rotor 4 against the friction material 3 on the rotating stand 11 was maintained constant at 0.98 MPa until the rotating stand 11 stopped.

Such a braking action was repeated 200 times (2×100 times). After finishing the 100th braking, the rotor 4, whose temperature was about 450° C., was cooled down to room temperature to observe the growing condition of the coating on its surface. Subsequently, another 100 times braking operation was conducted to observe the condition after the heat history. The presence or absence of scoring was examined at the hatched portion of the rotor 4. The magnitudes of the wear at four points on the friction material 3 were measured with a dial gauge; those on the rotor 4 were measured with a micrometer. The coefficient of friction $\mu$ was obtained from the formula $\mu=T/FR$, where F is the pressurizing force of the actuator 14, R is the effective braking radius, and T is the average torque obtained by using the values measured by the torque sensor 15 until the rotation stopped (see the testing machine 10 in FIG. 2).

The test results are shown in Table 2. The obtained results of improvement are evaluated by the following criteria in comparison with Examples 7 and 8, in which the friction materials include conventional metal fibers:

(a) The generation of scoring should be slight, if any.
(b) The magnitude of wear in the friction material 3 and the rotor 4 should be slight.
(c) The formed coating should be thin.
(d) The coefficient of friction should be on the same level before and after the heat history.

TABLE 2

| Evaluation item | 1 | 2 | 3 | 4 | 5 | 6 | 7 | 8 | 9 | 10 |
|---|---|---|---|---|---|---|---|---|---|---|
| Coefficient of friction (before heat history) | 0.38 | 0.32 | 0.38 | 0.39 | 0.36 | 0.38 | 0.38 | 0.39 | 0.38 | 0.38 |
| Coefficient of friction (after heat history) | 0.37 | 0.30 | 0.36 | 0.38 | 0.34 | 0.39 | 0.33 | 0.31 | 0.31 | 0.37 |
| Degree of change in coefficient of friction | Small | Small | Small | Small | Small | Small | Large | Large | Large | Small |
| Status of scoring generation | None | None | Slightly generated | None | None | Slightly generated | Generated | Generated | None | Slightly generated |
| Status of coating formation | Thin | Thin | Thin | Thin | Thin | Thin | Thick | Thick | Thick | Thin |
| Magnitude of wear of friction material (mm) | 0.06 | 0.07 | 0.08 | 0.09 | 0.10 | 0.11 | 0.19 | 0.21 | 0.10 | 0.11 |

TABLE 2-continued

| Evaluation item | 1 | 2 | 3 | 4 | 5 | 6 | 7 | 8 | 9 | 10 |
|---|---|---|---|---|---|---|---|---|---|---|
| Magnitude of wear of rotor (mm) | 0.03 | 0.02 | 0.05 | 0.04 | 0.03 | 0.05 | 0.17 | 0.19 | 0.02 | 0.10 |
| Overall evaluation | ⊚ | ○ | ○ | ⊚ | ○ | ○ | × | × | × | ○ |

Indication of evaluation: ⊚: Recommendable ○: Desirable Δ: Usable ×: Avoid long-term use.

As can be seen from the results shown in Table 2, the friction material of the present invention (Examples 1 to 6) was improved over the conventional friction material (Examples 7 and 8) in the wear resistance of the friction material and the rotor, clearly demonstrating the effect of the elimination of the metal fiber.

However, in Examples 2 and 5, in which a fine metal powder was added, although the scoring-inducing factor was reduced, the coefficient of friction decreased to some degree by the heat history. In Examples 3 and 6, although a shallow ring-shaped streak was found, it met the acceptable levels (on the other hand, a deep ring-shaped groove was generated in Examples 7 and 8).

Distinct from these examples, Examples 1 and 4 in which a metal powder having a particle diameter of 20 to 45 μm was added, showed the following satisfactory results:

(a) No scoring was generated.
(b) The magnitude of wear in the friction material 3 and the rotor 4 was negligible.
(c) The coefficient of friction was on much the same level before and after the heat history.

Therefore, it is preferable to use a metal powder having a particle diameter of 20 to 45 μm. Examples using an aluminum powder are not included in Table 1. Nonetheless, since aluminum has a thermal conductivity that lies midway between the thermal conductivity of iron and that of copper, the effect of aluminum is expected to be much the same as that of iron or copper.

The addition of an inorganic fiber reduced the growth of a coating, another target of the present invention, in comparison with Example 9, which had no inorganic fiber. The inorganic fiber also stabilized the coefficient of friction before and after the heat history, in comparison with Example 9. Example 10, which used an aluminosilicate fiber (CFF) having a Mohs hardness of 6, had a tendency to increase the wear of the rotor and friction material, despite a reduced added amount, in comparison with other examples that used a potassium titanate fiber having a Mohs hardness of 4 singly or in combination with slag wool having a Mohs hardness of 3.5.

An experiment was conducted to determine an optimum amount of the added inorganic fiber and metal powder. Table 3 shows the composition of the friction materials used. A metal powder having a particle diameter of 20 to 45 μm was used because this range of particle diameter exhibited good results in comparison with other ranges of particle diameter shown in Table 1. Constituents other than the inorganic fiber and metal powder were used with different ratios from those shown in Table 1. The total amounts of the other constituents were maintained constant in vol % throughout the examples. The manufacturing method was the same as in the previous examples.

TABLE 3

| Constituent | Specific name | Unit | 11 | 12 | 13 | 14 | 15 | 16 | 17 |
|---|---|---|---|---|---|---|---|---|---|
| Organic-fiber base material | Aramid fiber | vol % | 8 | 8 | 8 | 8 | 8 | 8 | 8 |
| Binder resin | Phenolic resin | vol % | 22 | 22 | 22 | 22 | 22 | 22 | 22 |
| Friction-adjusting agent | Graphite | vol % | 6 | 6 | 6 | 6 | 6 | 6 | 6 |
| | Molybdenum disulfide | vol % | 3 | 3 | 3 | 3 | 3 | 3 | 3 |
| | Cashew dust | vol % | 16 | 16 | 16 | 16 | 16 | 16 | 16 |
| Filler | Barium sulfate | vol % | 12 | 2 | 17 | 12 | 7 | 7 | 7 |
| | Calcium hydride | vol % | 3 | 3 | 3 | 3 | 3 | 3 | 3 |
| Inorganic powder | Mica and Zirconium silicate | vol % | 15 | 15 | 15 | 15 | 17 | 12 | 8 |
| Inorganic fiber | Potassium titanate *3 | vol % | 10 | 15 | 5 | | 15 | 15 | 15 |
| | Slag wool *4 | vol % | | | 5 | | | | |
| | CFF *5 | vol % | | | | 10 | | | |
| Metal powder | Copper powder (20 to 45 μm) | vol % | 5 | 5 | 5 | 5 | | | |
| | Iron powder (20 to 45 μm) | vol % | | | | | 3 | 8 | 12 |
| Total | | vol % | 100 | 100 | 100 | 100 | 100 | 100 | 100 |

*3: Mohs hardness: 4
*4: Mohs hardness: 3.5
*5: Mohs hardness: 6

The same evaluation test as was conducted on Examples 1 to 10 was conducted on the examples shown in Table 3. The results are shown in Table 4. In Examples 11 to 13, the effect of the amount of the inorganic fiber having a Mohs hardness of 4 was examined. The amount of 15 vol % was judged to be optimum taking the results of Examples 1 to 10 also into consideration. In Examples 15 to 17, the effect of the amount of the metal powder was examined. Example 15 showed the best result. Excessive use of a metal powder increases the thermal conduction of the friction material significantly, so that problems such as a vapor lock may be induced. Therefore, it is desirable that the amount be 20 vol % or less. As a result, the composition having a 15 vol % inorganic fiber and a 5 vol % metal powder is judged to be optimum in terms of the reduction in the scoring on the rotor and the stabilization of the coefficient of friction before and after a heat history.

TABLE 4

| Evaluation item | 11 | 12 | 13 | 14 | 15 | 16 | 17 |
|---|---|---|---|---|---|---|---|
| Coefficient of friction (before heat history) | 0.37 | 0.37 | 0.37 | 0.38 | 0.38 | 0.39 | 0.40 |
| Coefficient of friction (after heat history) | 0.35 | 0.36 | 0.35 | 0.37 | 0.37 | 0.38 | 0.39 |
| Degree of change in coefficient of friction | Small | Small | Small | Small | Small | Small | Small |
| Status of scoring generation | None | None | None | Slightly generated | None | None | None |
| Status of coating formation | Thin | Thin | Thin | Thin | Thin | Thin | Thin |
| Magnitude of wear of friction material (mm) | 0.05 | 0.05 | 0.05 | 0.18 | 0.05 | 0.10 | 0.13 |
| Magnitude of wear of rotor (mm) | 0.02 | 0.03 | 0.02 | 0.16 | 0.03 | 0.05 | 0.07 |
| Overall evaluation | ⊚ | ⊚ | ⊚ | Δ | ⊚ | ○ | ○ |

Indication of evaluation: ⊚: Recommendable ○: Desirable Δ: Usable ×: Avoid long-term use.

As can be seen from the test results, the elimination of the metal fiber can suppress the generation of scoring on the rotor. A metal powder cannot increase its effect limitlessly. It has an optimum amount of use. The addition of an inorganic fiber can solve the problem of the change in the coefficient of friction before and after a heat history caused by the formation of a coating on the surface of a rotor. If, however, the inorganic fiber is excessively hard, it attacks not only the coating but also the rotor. Therefore, it is desirable that the inorganic fiber have a Mohs hardness of 3 to 5. The inorganic fiber having a Mohs hardness in this range can be used in an appreciable amount, because it removes only the coating without attacking the rotor.

What is claimed is:

1. A friction material to be coupled with a rotor or a drum consisting mainly of an aluminum alloy reinforced by a hard material, the friction material comprising:

(a) a base material composed of an organic fiber;
(b) an inorganic fiber other than a metal fiber; and
(c) a metal powder having a particle diameter of 20 to 45 μm.

2. The friction material as defined in claim 1, wherein the inorganic fiber has a softening point of 850° C. or higher.

3. The friction material as defined in claim 1, wherein the inorganic fiber has a Mohs hardness of 3 to 5.

4. The friction material as defined in claim 1, wherein the inorganic fiber comprises at least one member selected from the group consisting of a potassium titanate fiber and slag wool.

5. A friction material as defined in claim 1, wherein the metal powder comprises at least one member selected from the group consisting of a copper powder, an iron powder, and an aluminum powder.

6. A friction material as defined in claim 1, wherein the metal powder comprises at least one member selected from the group consisting of a copper-alloy powder, an iron-alloy powder, and an aluminum-alloy powder.

7. A friction material as defined in claim 2, wherein the metal powder comprises at least one member selected from the group consisting of a copper powder, an iron powder, and an aluminum powder.

8. A friction material as defined in claim 3, wherein the metal powder comprises at least one member selected from the group consisting of a copper powder, an iron powder, and an aluminum powder.

9. A friction material as defined in claim 4, wherein the metal powder comprises at least one member selected from the group consisting of a copper powder, an iron powder, and an aluminum powder.

10. A friction material as defined in claim 2, wherein the metal powder comprises at least one member selected from the group consisting of a copper-alloy powder, an iron-alloy powder, and an aluminum-alloy powder.

11. A friction material as defined in claim 3, wherein the metal powder comprises at least one member selected from the group consisting of a copper-alloy powder, an iron-alloy powder, and an aluminum-alloy powder.

12. A friction material as defined in claim 4, wherein the metal powder comprises at least one member selected from the group consisting of a copper-alloy powder, an iron-alloy powder, and an aluminum-alloy powder.

* * * * *